United States Patent
Tatavu et al.

(10) Patent No.: US 12,450,235 B2
(45) Date of Patent: *Oct. 21, 2025

(54) METHOD AND APPARATUS FOR REPRESENTING A GROUP HIERARCHY STRUCTURE IN A RELATIONAL DATABASE

(71) Applicant: International Business Machines Corporation, Armonk, NY (US)

(72) Inventors: Paul-Vlad Tatavu, Ontario (CA); Joseph Paul Wigglesworth, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1749 days.

This patent is subject to a terminal disclaimer.

(21) Appl. No.: 16/675,483

(22) Filed: Nov. 6, 2019

(65) Prior Publication Data

US 2020/0073870 A1 Mar. 5, 2020

Related U.S. Application Data

(63) Continuation of application No. 11/491,427, filed on Jul. 21, 2006, now Pat. No. 10,503,736.

(51) Int. Cl.
*G06F 16/245* (2019.01)
*G06F 16/2455* (2019.01)

(52) U.S. Cl.
CPC .............................. *G06F 16/24553* (2019.01)

(58) Field of Classification Search
None
See application file for complete search history.

(56) References Cited

U.S. PATENT DOCUMENTS

| 8,412,750 | B2 | 4/2013 | Quin |
| 9,917,888 | B1* | 3/2018 | Bonagiri ................. H04L 47/70 |
| 2002/0049705 | A1 | 4/2002 | Haviv-Segal et al. |
| 2002/0129024 | A1 | 9/2002 | Lee |
| 2002/0138572 | A1 | 9/2002 | Delany et al. |
| 2002/0147746 | A1 | 10/2002 | Lee |
| 2003/0104733 | A1 | 6/2003 | Boreham et al. |

(Continued)

OTHER PUBLICATIONS

Nick Thompson and Pablo Fernicola; The Basics of QuickDraw 3D Geometries; MacTech;2002; pp. 1-18 (Year: 2002).*

(Continued)

*Primary Examiner* — Ann J Lo
*Assistant Examiner* — Jermaine A Mincey
(74) *Attorney, Agent, or Firm* — Yee & Associates, P.C.

(57) ABSTRACT

A computer implemented method, apparatus, system, and computer usable program product for managing a database. The process receives a request for a list of members for a given group of objects in the database. The process identifies a set of static members for the given group based on a set of records in a membership table in the database. The set of static members includes all direct static members and all indirect static members of the given group. The process identifies a set of dynamic members for the given group of objects based on a reference in a group table in the database. The set of dynamic members includes all direct dynamic members of the given group and all indirect static members of the given group. The process generates the list of members.

24 Claims, 8 Drawing Sheets

(56) References Cited

U.S. PATENT DOCUMENTS

| | | | |
|---|---|---|---|
| 2003/0105733 | A1 | 6/2003 | Boreham et al. |
| 2003/0217034 | A1 | 11/2003 | Shutt |
| 2004/0014570 | A1 | 1/2004 | Smith et al. |
| 2004/0015470 | A1 | 1/2004 | Smith et al. |
| 2004/0059705 | A1 | 3/2004 | Witkke et al. |
| 2004/0210582 | A1 | 10/2004 | Chatterjee et al. |
| 2004/0243576 | A1 | 12/2004 | Shrivastava et al. |
| 2005/0021498 | A1 | 1/2005 | Boreham et al. |
| 2005/0027721 | A1 | 2/2005 | Saenz |
| 2006/0004690 | A1 | 1/2006 | Beartusk et al. |
| 2006/0085440 | A1* | 4/2006 | Jandhyala ............... G06F 16/10 |
| 2007/0156736 | A1 | 7/2007 | Bestgen et al. |
| 2007/0233582 | A1* | 10/2007 | Abhyanker ........... H04W 4/021 705/28 |
| 2008/0021913 | A1 | 1/2008 | Tatavu et al. |

OTHER PUBLICATIONS

Peter Dickman; Diffusion Tree Restructuring for Indirect Reference Counting; CiteSeer; 2000; pp. 1-2 (Year: 2000).*

Carl Goul; Static Checking of Dynamically Generated Queries in Database Applications; 2004; IEEE;pp. 1-10.*

Pardede, "On Using Collection for Aggregation and Association Relationships in XML Object-Relation Storage", 2004, ACM, pp. 1-8.

Thompson, "The Basics of QuickDraw 3D Geometrics", 2002, MacTech, pp. 4-5.

Dickman, "Diffusion Tree Restructuring for Indirect Reference Counting", 2000, CiteSeer, pp. 1-3.

Babcock, "Dynamic Sample Selection for Approximate Query Processing", 2003, ACM, pp. 539-550.

Office Action, dated Jul. 14, 2008, regarding U.S. Appl. No. 11/491,427, 23 pages.

Final Office Action, dated Dec. 12, 2008, regarding U.S. Appl. No. 11/491,427, 17 pages.

Office Action, dated Oct. 6, 2009, regarding U.S. Appl. No. 11/491,427, 17 pages.

Office Action, dated May 6, 2010, regarding U.S. Appl. No. 11/491,427, 16 pages.

Office Action, dated Jul. 24, 2014, regarding U.S. Appl. No. 11/491,427, 18 pages.

Office Action, dated Mar. 13, 2015, regarding U.S. Appl. No. 11/491,427, 25 pages.

Office Action, dated Decemeber 2, 2015, regarding U.S. Appl. No. 11/491,427, 27 pages.

Final Office Action, dated May 23, 2016, regarding U.S. Appl. No. 11/491,427, 42 pages.

Office Action, dated Jan. 31, 2017, regarding U.S. Appl. No. 11/491,427, 11 pages.

Final Office Action, dated Jun. 16, 2017, regarding U.S. Appl. No. 11/491,427, 14 pages.

Notice of Allowance, dated Aug. 1, 2019, regarding U.S. Appl. No. 11/491,427, 10 pages.

* cited by examiner

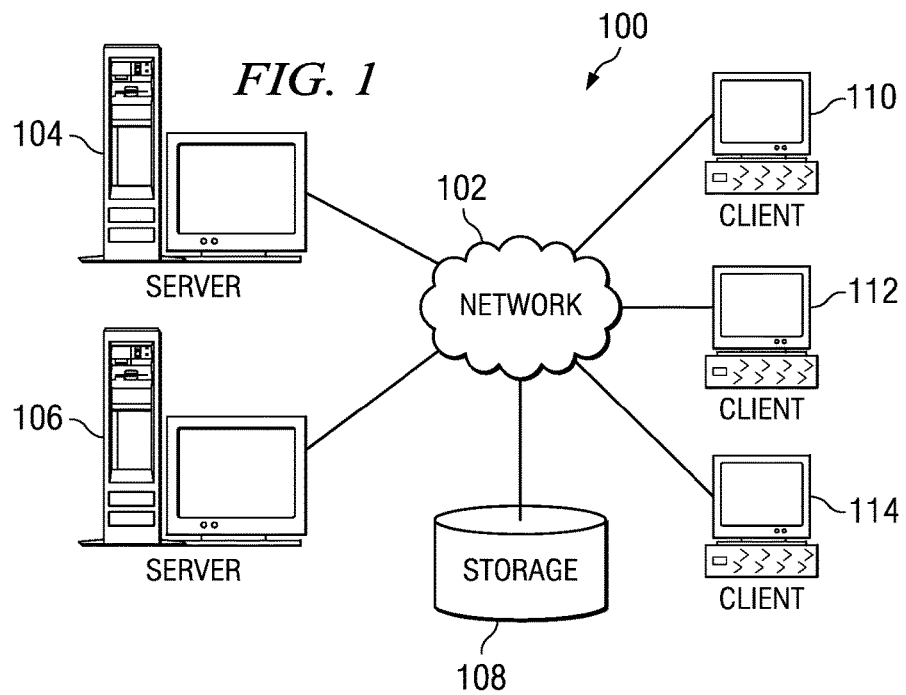

| KEY | NAME | DATA TYPE | LENGTH | NULLABLE |
|---|---|---|---|---|
| PRIMARY | Group_ID | BIGINT | 8 | NO |
|  | DESCRIPTION | VARCHAR | 2000 | YES |

310, 320

| KEY | NAME | DATA TYPE | LENGTH | NULLABLE |
|---|---|---|---|---|
| PRIMARY | ID | BIGINT | 8 | NO |
| FOREIGN | GROUP_ID | BIGINT | 8 | NO |
| FOREIGN | MEMBER_ID | BIGINT | 8 | NO |

| KEY | NAME | DATA TYPE | LENGTH | NULLABLE |
|---|---|---|---|---|
| PRIMARY | ID | BIGINT | 8 | NO |
| FOREIGN | GROUP_ID | BIGINT | 8 | NO |
| FOREIGN | MEMBER_ID | BIGINT | 8 | NO |
|  | IS_DIRECT_MEMBER | CHARACTER | 1 | YES |
|  | IS_NESTED_GROUP | CHARACTER | 1 | YES |
|  | INDIRECT_MEMBER_REF_COUNT | BIGINT | 1 | YES |

| KEY | NAME | DATA TYPE | LENGTH | NULLABLE |
|---|---|---|---|---|
| PRIMARY | GROUP_ID | BIGINT | 8 | NO |
|  | DESCRIPTION | VARCHAR | 2000 | YES |
| FOREIGN | QUERY_OBJECT_ID | BIGINT | 8 | YES |

910, 920, 930

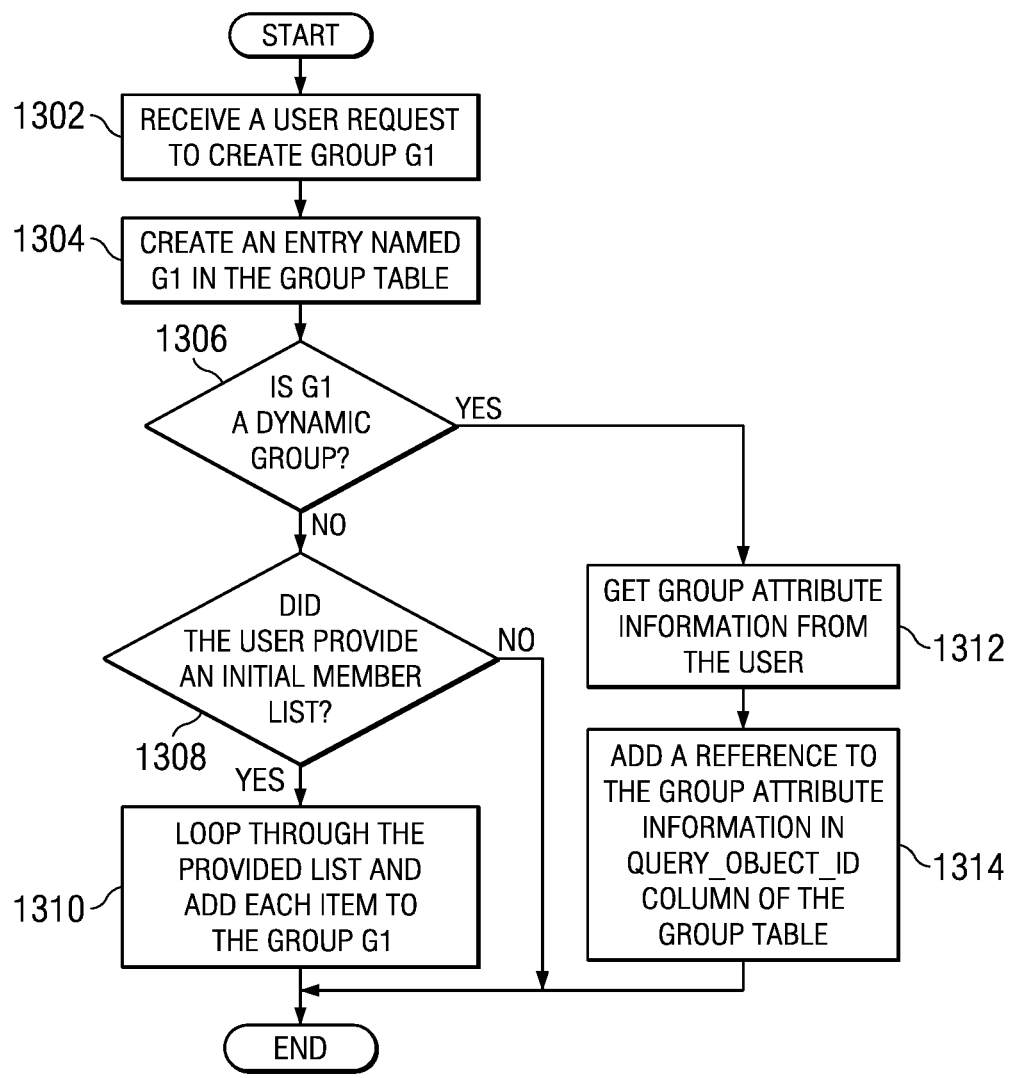

METHOD AND APPARATUS FOR REPRESENTING A GROUP HIERARCHY STRUCTURE IN A RELATIONAL DATABASE

BACKGROUND

1. Field

The present application relates generally to an improved data processing system and in particular to a method and apparatus for managing a database. Still more particularly, the present application relates to a computer implemented method, apparatus, system, and computer usable program product for representing a group hierarchy structure in a relational database that supports both static and dynamic groups.

2. Description of the Related Art

A relational database is a database in which data is stored in one or more related database tables. Each database table includes columns and rows. A column, referred to herein as a field, is a predefined data category. For example, a database table having information for the residents of a municipality could include fields for the following categories of information: name, address, and phone number.

Each row of a database table, referred to herein as a record, contains a unique instance of data for the category defined by the column. In the example above, a record in the database table for the municipality could include the following information: Joe Smith, 111 Main Street, (555) 555-5555. The record includes all the data in a given row of the database table corresponding to one or more predefined categories in the database table.

A single relational database system can be spread across several database tables. A current relational database can include anywhere from one to more than one-thousand database tables. For example, the relational database for the municipality could include another table for municipal parking fines. The table for parking fines could include fields for name, amount owed, and due date.

A database manager is software to manage the collection of data stored in a set of one or more database tables. The database manager can retrieve data from tables based on relations of the data. Relations are a way of organizing data to permit flexible and varied operations on data. In other words, data can be accessed or reassembled in many different ways in response to a user query without having to reorganize the data in the set of one or more relational database tables. A database manager typically permits a user to sort data in the relational database based on any field and/or generate results that include only certain fields from one or more records.

In the example above, a user might query the municipality relational database for a mailing list of all residents that received parking tickets. The relational database could provide query results including the names of residents from the name field of the parking fines table and addresses from the table for resident information.

Relational databases are frequently implemented using groups of objects. A group of objects includes any collection of objects. Typically, groups of objects in a relational database are implemented using a group table and a membership table. As used herein, a group table is a table of all the groups defined in the relational database. The group table contains information about the group, such as the group's name and/or the group's primary key. A membership table is a table including information about each member of every group in the group table. Each member of a group has a record in a membership table.

Thus, if the municipality has two-hundred and five residents that are all members of the group "Residents", the group table would include one record for the "Residents" group. The membership table would include two-hundred and five records for the "Residents" group in which each record would be marked with the "Residents" group primary key.

However, users frequently need to utilize nested groups. A nested group is a group member that is itself a group having members. For example, a group "A" can include members 1, 2, and 3. Member 3 can itself be a group having members B1 and B2. When nested groups are members of other groups in this manner, the members of the nested groups are considered to be indirect members of the containing groups. In other words, members B1 and B2 in this example are considered members of group "A."

To determine group membership in such a case, the database manager must perform multiple queries to work through the entire hierarchy of nested groups. In the above example, the results of the first query, providing members 1, 2, and 3, need to be examined to determine if any member is a nested group. For each member that is a group, such as member 3, another query must be executed to determine the nested group's membership. This process continues recursively until no more members that are groups are found. This system of determining group membership where hierarchies of nested groups are utilized is inefficient.

Moreover, group implementation relying on defining group members in a membership table means the membership of a group must be all static members. A static member is a member of a group that must be manually added to the group or deleted from the group in the membership table in order to change the group membership. This requirement creates a lot of maintenance for users.

An alternative group implementation is one in which the group members are defined by a set of common attributes, not by records in a membership table. These are dynamic groups because they require no membership list maintenance. If an object in the database has attributes that match those required for dynamic group membership, the object is automatically part of the dynamic group.

Users need both static and dynamic groups to solve business problems. However, current relational database systems do not support utilization of both static and dynamic groups combined together in a single group hierarchy structure. In addition, multiple queries are typically required to identify the members of groups in a relational database system utilizing nested groups as the members of groups.

SUMMARY

The different illustrative embodiments of the present invention provide a computer implemented method, apparatus, system, and computer usable program product for managing utilization of both static and dynamic groups combined together in a single group hierarchy structure in a database. The process receives a request for a list of members for a given group of objects associated with the database. The process identifies a set of static members for the given group of objects based on a set of records in a membership table in the database. The set of static members for the given group of objects includes all direct static members of the given group and all indirect static members of the given group.

The process identifies a set of dynamic members for the given group of objects based on a reference in a group table in the database. The set of dynamic members includes all direct dynamic members of the given group and all indirect static members of the given group. The process generates the list of members. The list of members includes the set of static members and the set of dynamic members.

BRIEF DESCRIPTION OF THE DRAWINGS

The novel features believed characteristic of the invention are set forth in the appended claims. The embodiments of the invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

FIG. 8 is a block diagram illustrating a group membership table in accordance with an illustrative embodiment;

FIG. 9 is a block diagram illustrating a group table definition in accordance with an illustrative embodiment;

FIG. 13 is a flowchart illustrating a process for creating a group of objects in accordance with an illustrative embodiment.

DETAILED DESCRIPTION

Figures 3, 4, 5:
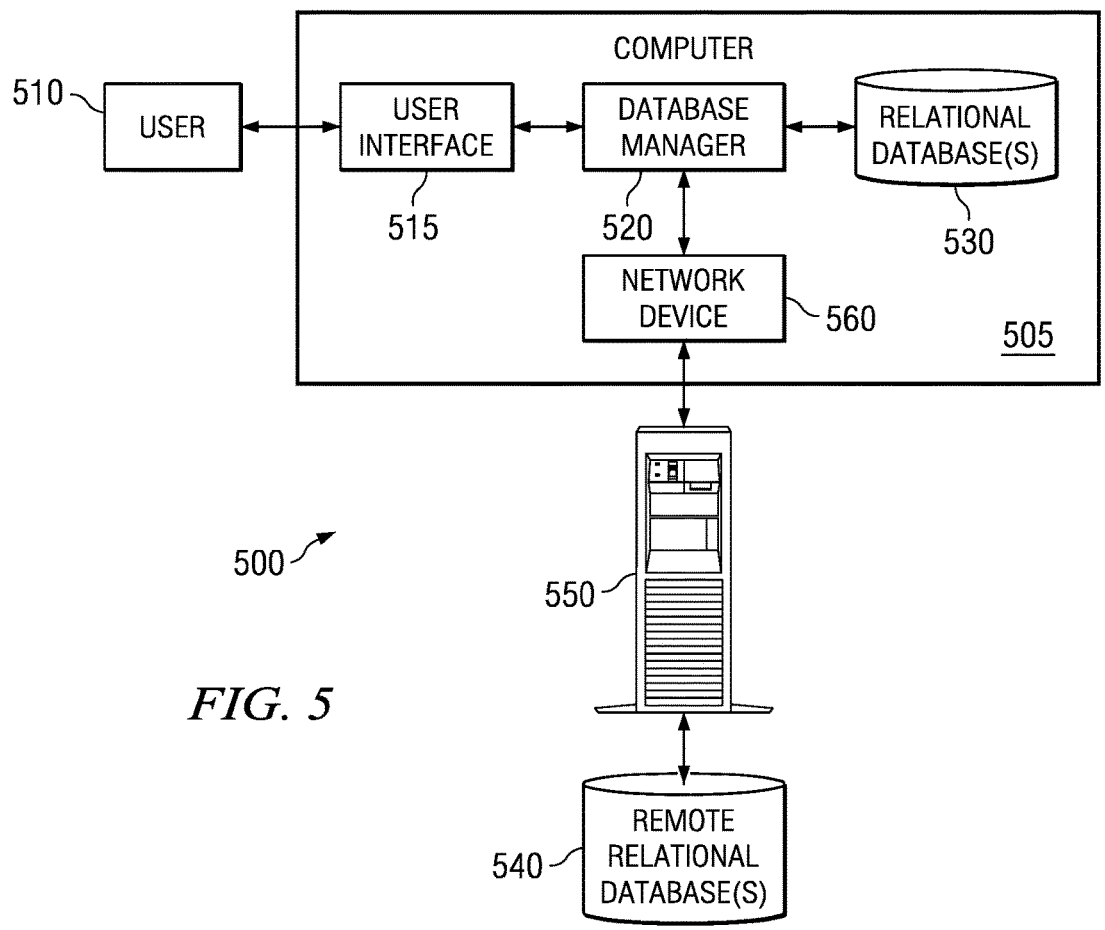
FIG. 3 is a block diagram of a prior art group table definition in accordance with an illustrative embodiment.
FIG. 4 is a block diagram of a prior art membership table definition in accordance with an illustrative embodiment.
FIG. 5 is a block diagram illustrating a relational database system in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communication links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

A relational database is a database in which data is stored in one or more related database tables. Each database table includes columns and rows. A column, referred to herein as a field, is a predefined data category. Each row, referred to herein as a record, contains a unique instance of data for the category defined by the field. A record includes all the data in a given row of the database table.

A single relational database system can be spread across several tables stored in one or more database(s). A current relational database can include anywhere from one to more than one-thousand database tables.

A database manager is software used to manage the collection of data stored in a set of one or more database table(s). The database manager can retrieve data from the relational database based on relations of the data stored in the database. Thus, data can be accessed or reassembled in many different ways in response to a user query without having to reorganize the data in the relational database table(s). A database manager associated with in a relational database system typically permits a user to sort data in one or more database(s) based on any field and/or generate results that contain only certain fields from one or more records.

Relational databases are frequently implemented using groups of objects. A group of objects includes any collection of objects. Typically, groups of objects in a relational database are implemented using a group table and a membership table. A group table is a table that is used to hold the primary key values that are used to look up the members of a group. Each group has a record in the group table.

A membership table is a table including information about each member of every group in the group table. Each direct member of a group has a record in a membership table. For example, group A can include members 1, 2, and 3. Members 1, 2, and 3 are direct members of group A.

When hierarchies of nested groups are defined such that groups can be members of other groups, the members of nested groups are considered to be indirect members of the container group. A nested group is a group of objects that is itself a member of another group of objects.

For example, in group A, which has members 1, 2, and 3, member 3 can itself be a group having members B1 and B2. Member B1 can also be a group having members C1 and C2. In this case, group A is a container group. Group 3 and group B1 are nested groups. Members B1 and B2 are indirect members of group A. Members C1 and C2 are also indirect members of group A.

However, in the prior art, membership tables only provide information regarding direct members of a group. Therefore, a database manager executes multiple queries to work through the hierarchy of nested groups in order to determine the membership of a group in which members of the group are nested groups. For example, the results of a first query regarding the membership of group A would provide members 1, 2, and 3. A second query to the membership table would be necessary to determine the membership of the nested group member 3. A third query to the membership table would then be performed to determine the membership of the nested group member B1. Thus, each member is evaluated to determine if that member is a nested group. For each member that is a nested group, another query is executed to determine that group's membership. This process continues recursively until no more members that are groups are found.

Furthermore, membership tables only provide information regarding group members that are static members, as opposed to dynamic members. A static member of a group is a member of a group that must be manually added to the group or deleted from the group in order to change the group membership. This requirement creates a lot of maintenance for users.

An alternative group implementation is one in which the group members are defined by a set of common attributes, not by records in a membership table. These are dynamic groups because they require no membership list maintenance. If an object in the database has attributes that match those required for group membership it is automatically part of the group. However, current implementations of relational database systems do not permit utilization of both static groups and dynamic groups together. For example, a member of a static group cannot itself be a dynamic group.

Turning now to FIG. 3, a block diagram of a prior art group table definition is shown. All members of the same group in the membership table have the same group primary key. In this way, a single query can be used to efficiently find all members of a group associated with a given group by means of the group primary key. Each of the members can in turn be uniquely identified by its own member primary key.

In these illustrative examples, records 310 and 320 are definitions for group table variables. Record 310 is a definition for a variable "Group_ID" to hold a value for a group primary key associated with a given group in the relational database. The "Group_ID" variable is an integer type variable.

Record 320 is a definition of type character (CHAR) for a variable "DESCRIPTION." The "DESCRIPTION" variable for holding a text description for the group. For example, if a group is a group of residents, the "DESCRIPTION" variable could include the following text: "current residents."

Referring to FIG. 4, a block diagram of a prior art membership table definition is depicted. A membership table is a database table including information corresponding to the members of each group represented in the group table. The membership table only includes information regarding the direct members of each group referenced in the group table. Records 410, 420, and 430 are variable definitions for a membership table.

Record 410 is a definition for an identifier "ID" variable of type integer. The identifier ID uniquely identifies a record in the membership table.

Record 420 is a variable for a group identifier "Group_ID" of type integer. The "Group_ID" variable is a group primary key for a given group represented in the group table. Thus, each member in the membership table can be identified as a member of a particular group based on the group primary key value in the "Group_ID" variable.

Record 430 is a variable for a member identifier "Member_ID" to uniquely identify each member of a given group. The "Member_ID" definition in record 430 is a definition for a variable of type integer. The group membership table definition can be used to establish a current group membership table.

Thus, in the prior art implementations of relational database systems, a database manager performs multiple queries to determine the membership of groups in relational database systems supporting hierarchies of nested groups. Moreover, the prior art relational database systems do not support utilization of groups having both static and dynamic groups in a hierarchy of groups.

The illustrative embodiments recognize that users need both static and dynamic groups to solve business problems. The illustrative embodiments also recognize that utilizing multiple queries to determine group membership where hierarchies of nested groups are utilized is inefficient. Therefore, the different illustrative embodiments provide an improved computer implemented method, apparatus, system, and computer usable program product for managing a database.

The illustrative embodiments provide a group table that provides a nullable key reference variable indicating if a group referenced in the table is a dynamic group. If the nullable key reference variable is null or empty, the group is not a dynamic group. However, if the nullable key reference contains a value or pointer pointing to an object defining attributes of the group membership, then the group is a dynamic group. The illustrative embodiments execute the object defining the group attributes to determine the membership of the dynamic group.

The illustrative embodiments provide an improved membership table that provides information regarding both indirect members of a group, as well as direct members of a group. Thus, a database manager can generate a list of all direct and indirect members of a group based on a single query to the membership table. In addition, the illustrative embodiments provide a nested variable in the membership table that indicates if a member of a group is a nested group. If a member is a nested group, the database manager will check the group membership table to determine if the group member is a dynamic group based on the nullable key reference.

Thus, in accordance with an illustrative embodiment, when the process receives a request for a list of members for a given group of objects associated with the database, the process identifies a set of static members for the given group of objects based on a set of records in a membership table in the database. The set of static members for the given group of objects includes all direct static members of the given group and all indirect static members of the given group. Thus, the process can identify the set of static references based on single database query.

The process identifies a set of dynamic members for the given group of objects based on a reference in a group table in the database. The reference in the group table is a reference to a query object that defines attributes of the dynamic members of the given group. The set of dynamic members includes all direct dynamic members of the given group and all indirect static members of the given group. The process generates the list of members, wherein the list of members includes the set of static members and the set of dynamic members.

The list of members is used by a database manager and/or a user to manage the database. Managing a database includes, but is not limited to, creating new groups of object, adding an initial set of members to a new group of objects, adding one or more new member to a pre-existing group of objects, deleting one or more members from a pre-existing group of objects in the relational database system, updating database tables, and/or generating results in response to user queries to the relational database system. As used herein, a set of members can include a single member, as well as two or more members.

The process provides the methods used for the maintenance of the group membership lists including methods to add and remove members of static groups and to specify common attributes for determining membership of dynamic groups.

FIG. 5 is a block diagram illustrating a relational database system in accordance with an illustrative embodiment. Relational database system 500 is a database system that includes one or more relational databases having data stored in database table(s). Relational database system is a data processing system, such as data processing system 100 in FIG. 1 and data processing system 200 in FIG. 2.

In the illustrative embodiments, relational database system 500 includes computer 505. Computer 505 is any known or available computing device shown in FIGS. 1 and 2, including but not limited to a client computer, a server computer, a laptop, tablet PC, or a personal digital assistant (PDA).

User 510 requests results for a query from relational database system 500. A query from a user can include a request for a list of members of a group of objects, a request to add a member to a group in a relational database, and/or deletes a member from a group in a relational database, via user interface 515. User interface 515 is any type of known or available interface for providing input to computer 505 and/or receiving output from computer 505, including but not limited to, a graphical user interface (GUI), a menu-driven interface, and/or a command line interface.

Database manager 520 is, in these examples, a relational database management system software component for managing relational database system 500. In this illustrative example, database manager 520 uses structured query language (SQL) to identify and retrieve information from the relational database, as well as update database tables. However, database manager 520 can be implemented using any known or available method for implementing a database management system, including but not limited to hierarchical database management systems and object oriented database management systems.

Database manager 520 manages data in tables stored in relational databases, such as relational database(s) 530 associated with computer 505. Managing data in tables includes, but is not limited to, creating new groups, adding new members to groups, deleting members from groups, updating information in database tables, and generating results of user queries for display to a user. In this illustrative example, relational database tables associated with relational database(s) 530 are located on a single database component. However, in accordance with another illustrative embodiment, relational database tables are located on two or more database components associated with computer 505.

In addition, database manager 520 also manages data in relational database tables stored on remote relational databases, such as remote relational database(s) 540. Remote relational database(s) 540 is any type of database for storing a collection of data that is not located on computer 505. In this illustrative example, remote relational database(s) 540 is located on server 550. Relational database(s) 530 and remote relational database(s) 540 form a set of databases.

Server 550 is any type of server, such as servers 104 and 106 in FIG. 1. Server 550 can be a server on a network, such as network 102 described in FIG. 1. Computer 505 accesses remote relational database(s) 540 on server 550 through a network connection via network device 560.

Network device 560 is any type of network access software known or available for allowing computer 505 to access a network. Network device 560 connects to a network connection, such as network 102 in FIG. 1. The network connection permits access to any type of network, such as a local area network (LAN), a wide area network (WAN), or the Internet.

Relational database(s) 530 and remote relational database(s) 540 store group tables and membership tables for group objects, including hierarchies of nested groups for both static and dynamic groups. A nested group is a group member that is itself a group having members. Each member of a nested group is considered to be a member of the container group. A container group is a group that includes the nested group. In other words, the members of nested groups are considered to be inclusive members of a container group. However, the members of a container group are not necessarily members of the nested group.

Figure 6:
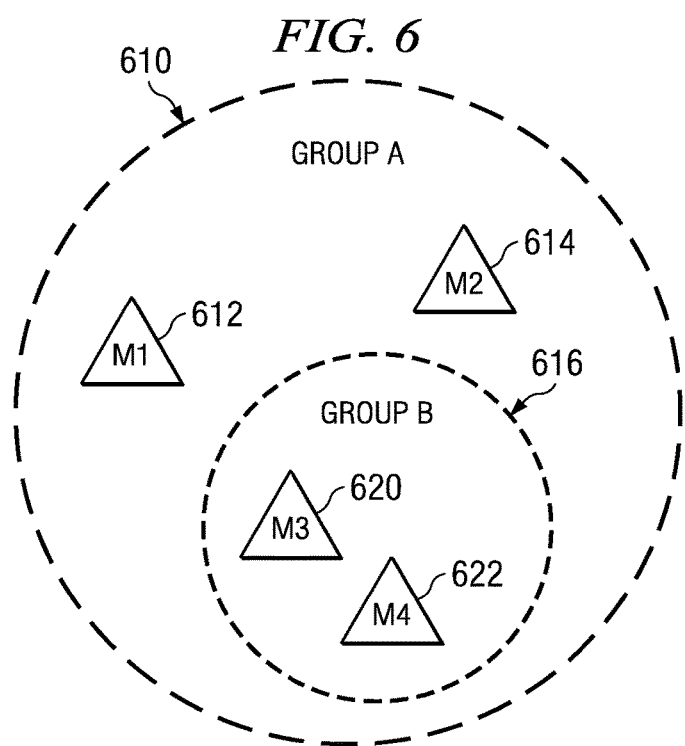
FIG. 6 is a block diagram illustrating a group hierarchy structure in a relational database system in accordance with an illustrative embodiment.

FIG. 6 is a block diagram illustrating a group hierarchy structure in a relational database system in accordance with an illustrative embodiment. Group A 610 is a group having three members as follows: M1 612, M2 614, and Group B 616. Group B 616 is a nested group having members. The members of Group B 616 are as follows: M3 620 and M4 622. In this example, Group A is a container group having three direct members, namely M1 612, M2 614 and Group B 616. As a container group, Group A 610 is also considered to have as members, all the members of nested group B. Therefore, Group A also has two indirect members, namely M3 620 and M4 622.

In this example, if M3 620 were also a nested group having members C1, C2, and C3, then Group A would also be considered to have C1, C2, and C3 as indirect members through Group B 616 and group M3 620.

In this illustrative example, all members of Group A 610 are static members. Static members are members that are explicitly added or deleted from a membership group by a user. In these examples, a user manually adds or deletes a static member from a group membership table in order to change the group membership for the group.

In contrast, a dynamic member of a group is identified as a member of a group based on the current attributes of the member object. In other words, group members of a given group can be defined by an object pointed to by a nullable foreign key reference field in a group table as any objects having the attribute of owing money. Each time a database manager queries the database table to determine a membership of the group, a query object would be executed against the database system to search for all objects in the relational database associated with an accounts payable, amount due, or other field or indicator of money owed.

For example, if Group B 616 were a dynamic group for members owing library fines, a query object would be executed to determine the member objects associated with library patrons that currently owe money to the library. Today, the members in Group B 616 could include three library patrons. However, tomorrow Group B 616 may only include two library patrons if one of the three patrons pays their library fine during the intervening time period.

A dynamic group of objects does not require a membership table to provide information regarding the members of the group due to the fact that the dynamic group membership can constantly change based on dynamic attributes. Thus, a dynamic group membership can change based on changing attributes of member objects without requiring a user to manually alter the records in a membership table associated with the group of members.

The illustrative embodiments recognize that users need both static and dynamic groups in group hierarchies within relational databases in order to solve business problems. Therefore, the illustrative embodiments provide an improved group table and membership table for relational databases. The membership table contains information regarding all direct and indirect members for each group in a group table. The membership table also indicates whether each direct and each indirect member is a nested group. For each member that is a nested group, the database manager checks the group table nullable foreign key reference field provided by the illustrative embodiments to determine if the nested group is a dynamic group. If the group is a dynamic group, the database manager executes the object defining the attributes for the dynamic group against the database system to obtain the current members of the dynamic group. In this manner, the membership of a group can be determined with a single query if all members are static members. The illustrative embodiments also enable dynamic groups to be members of static groups by providing a nullable foreign key reference in a group table to indicate whether a group is static or dynamic. If a group is static, the nullable foreign key reference in the group table will be null or empty. Thus, the relational database of the illustrative embodiments supports group hierarchies in which members may include both static members, as well as dynamic members.

Figure 7:
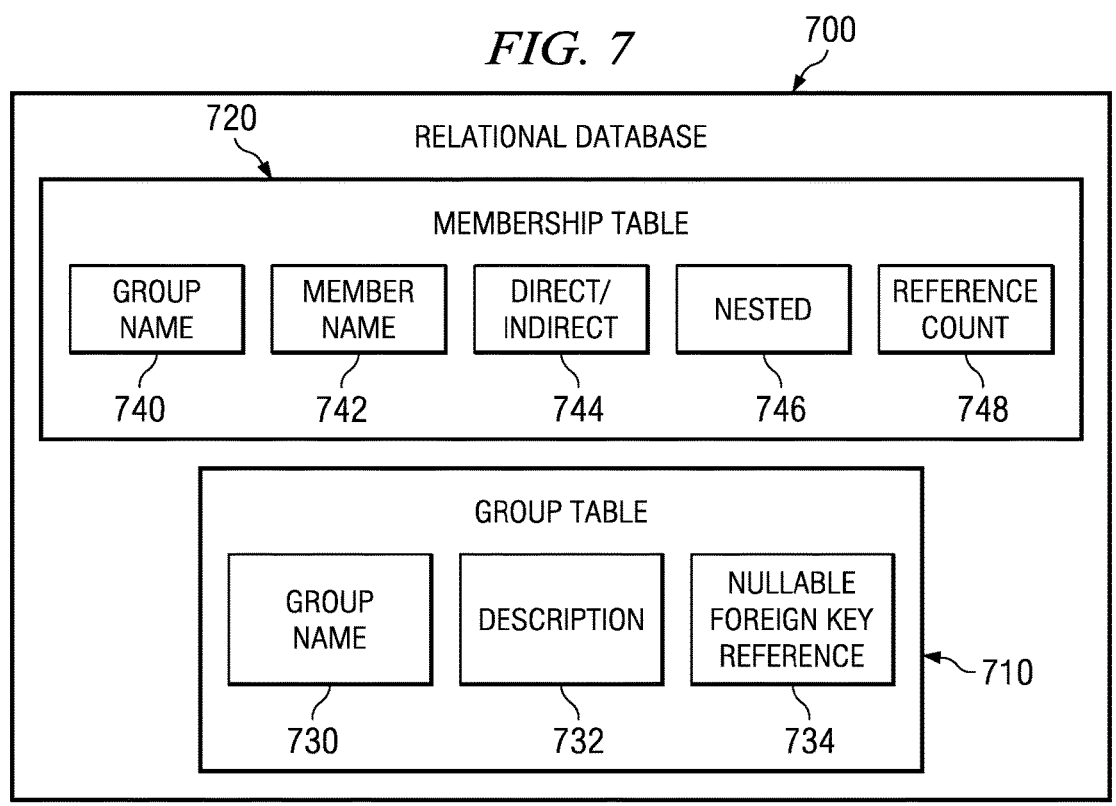
FIG. 7 is a block diagram illustrating a relational database in accordance with an illustrative embodiment.

Referring now to FIG. 7, a block diagram illustrating a relational database is shown in accordance with an illustrative embodiment. Relational database 700 is a relational database, such as relational database(s) 530 and remote relational database(s) 540 in FIG. 5. Relational database 700 stores one or more group tables, such as group table 710. Relational database 700 also stores one or more membership tables, such as membership table 720.

Group table 710 is a group definition table for a group of members identified by group name field 730. Group name field 730 can include a primary key identifying a given group.

Description field 732 provides a place to store a textual description of the group. Group definition table 710 also includes nullable foreign key reference field 734 to a query object defining attributes for a dynamic group. The presence of a reference to a query object indicates that the group is a dynamic group. The members of a dynamic group are determined by executing the query object against a database in the database system. The database may or may not be the same database that contains the group table. In this example, the query object is an SQL query. However, the query object may also be implemented as a list of attributes or any other object defining attributes for identifying group members. Dynamic groups allow a user to quickly form a group of objects that share common attributes and allow these groups to remain current without the user having to explicitly add or delete members of the group in a membership table.

Membership table 720 is a membership table providing information regarding the members of a group. Membership table 720 provides information regarding both indirect and direct members of a given group. In this illustrative example, the members of a dynamic group are not identified in the membership table because dynamic group membership is dependent on changing attributes of object in the database system. Dynamic members are identified by executing a query object referenced by nullable foreign key reference field 734 against the database system. In other words, nullable foreign key reference 734 indicates whether a group is a dynamic group.

Group name field 740 identifies a given group based on a group name corresponding to group name field 730 in group table 710. The group name may include a primary key for the given group. Group name field 740 is used to identify a group to form an identified group.

Member name field 742 identifies a given member of the identified group of members to form an identified member. Each member in the membership group having a common group name field is a member in a set of members for the identified group.

Direct/indirect field 744 indicates if the identified member is a direct member or is an indirect member of the group. Thus, a database manager can obtain a list of all direct and indirect members of a given identified group with a single query to the membership table. Thus, a database manager can check this direct/indirect field in the membership table to determine whether a member of the given group is a direct static member of the group or an indirect static member of the group.

Nested field 746 indicates whether the identified member of a given group of objects is a nested group. If the identified member is a nested group, the members of the nested group would be indirect members of the identified group. The static indirect members of the identified group are indicated in the direct/indirect field 744 of the membership table. Placing this information in the membership table makes it possible to simply and efficiently determine which members are groups without the need to refer back to the group table and search it for the member name. Thus, a database manager can use or check this nested field in the membership table to determine whether a member of a given group is a nested group.

Moreover, a member of the group that is a nested group could be a static nested group or a dynamic nested group. The indirect members of a static nested group are provided in membership table 720. However, a query object defining the attributes of a dynamic group is executed to determine the membership of a dynamic group. Thus, in response to determining that a member of a group of objects is a nested member based on nested field 746, the database manager checks a nullable foreign reference field 734 of group table 710 for the nested group to determine if the nested group is a dynamic group to form a dynamic nested group. The nullable foreign key reference in the group table is a reference to a query object that defines the attributes of the dynamic members of the given group.

If the group is a dynamic nested group, the query object for the dynamic nested group is executed to identify a set of members of the dynamic nested group to form a set of dynamic members. The members of the dynamic nested group are indirect dynamic members of the group of objects. In this manner, the set of members of the dynamic nested group are identified by the database manager based on a single database query.

Due to the nature of the hierarchical group structure, it is possible for an indirect member to be an indirect member through several associations. In order to avoid having duplicate indirect membership records, reference count field 748 provides an indicator to track the indirect membership of each indirect member. Reference count field 748 indicates a number of indirect members for the given member of a group. Thus, if a member B1 is an indirect member of group A and an indirect member of group M3, the reference count field for member B1 would have a value of "two" to indicate that B1 is an indirect member of two groups in the hierarchy of groups for group A.

In this illustrative embodiment, membership table provides information regarding all direct and indirect members of static groups. Therefore, a database manager can determine all direct and indirect membership of an identified group with a single query. In this manner, a database manager can avoid performing multiple queries to determine the membership of each nested group, iteratively, until no more members that are groups are found. Thus, a membership table in accordance with the illustrative embodiments permits a database manager to perform membership searches more quickly and efficiently.

FIG. 8 is a block diagram illustrating a group membership table in accordance with an illustrative embodiment. Membership table definition 800 is a definition for variables of a membership table, such as membership table 720 in FIG. 7. Record 810 is a definition for a variable "Group_ID" for a variable to identify a group of members, such as group name field 740 in FIG. 7. Record 810 is a variable of type integer.

Record 820 is a variable of type integer for a variable "Member_ID." Record 820 "Member_ID" variable identifies a member in a given group of members, such as member name field 742 in FIG. 7.

Record 830 is a definition for a variable of type character for a variable "IS_DIRECT_MEMBER." Variable "IS_DIRECT_MEMBER" indicates whether the given member is a direct member of the group of members or an indirect member due to the hierarchical structure of the groups, such as direct/indirect field 744 in FIG. 7. Thus, a database manager can determine whether a member of a given group is a direct static member of the group or an indirect static member of the group by checking this direct/indirect field 744.

Record 840 is a definition for a variable "IS_NESTED_GROUP" of type character. The variable "IS_NESTED_GROUP" indicates whether the given member of the group of members is a nested group, such as nested field 746 in FIG. 7. No limit is placed on the depth or degrees to which a group can be nested. It is possible for a particular object to be an indirect member of one group due to several associations.

Record 850 is a definition for a variable "INDIRECT_MEMBER_REF_COUNT" of type integer. The variable "INDIRECT_MEMBER_REF_COUNT" is used to track the number of occurrences of a given group member due to multiple instances of indirect membership of the given group member through various associations, such as reference count field 748 in FIG. 7. When a member is added to an identified member that is a nested object, the new member also is added as an indirect member to all other groups that the current group is a member of. For example, referring back to FIG. 6, if a new member M5 is added to Group B, then the same object M5 is added as an indirect member of group A.

However, in this example, if the object M5 is already an indirect member of Group A via another relationship in the group membership hierarchy, the reference count of the existing indirect member M5 is simply incremented or increased by one. A new database record is not created in this case because an indirect membership database record for M5 is already in existence for Group A.

Likewise, when a group member is removed from a group, then all indirect memberships of that group member is removed as well. Referring again to FIG. 6, if Group B 616 is removed from Group A 610, then the indirect memberships of M3 620 and M4 622 are also removed from Group A 616.

Turning now to FIG. 9, a block diagram illustrating a group table definition is shown in accordance with an illustrative embodiment. Group table definition 900 is a definition for variables in a group table, such as group table 710 in FIG. 7.

Record 910 is a definition for a group identifier "GROUP_ID" variable of type integer. The variable "GROUP_ID" identifies a given group. The "GROUP_ID" variable can include a primary key or group name for identifying the group, such as group name 730 in FIG. 3.

Reference 920 is a definition for a variable "DESCRIPTION" of type character (CHAR). "DESCRIPTION" holds a text description to describe the group, such as description field 732 in FIG. 7.

Reference 930 is a definition for a variable "QUERY_OBJECT_ID" of type integer. The "QUERY_OBJECT_ID" is a variable for a nullable foreign key reference to a query object, such as nullable foreign key reference field 734 in FIG. 7. The presence of a reference to a query object indicates that the group is a dynamic group. The members of a dynamic group are determined by executing the reference query against a database. This may be the same database where the group and membership tables are stored, such as relational database(s) 530 in FIG. 5, or it may be a remote relational database capable of storing a collection of data that is located on a different computer, such as remote relational database(s) 540 in FIG. 5. The database may or may not be the same database that contains the group table.

The group membership table does not include records for members of a dynamic group. However, a dynamic group can be a member of a static group. When a dynamic group is encountered as a nested group member of a static group during a search of the static group's membership, the dynamic group's query is evaluated by the database manager to determine its members. The results are added to the result set of members already identified. This result set is stored in memory until the process of determining the membership list is complete and then the result set is returned to the requester.

Figure 10:
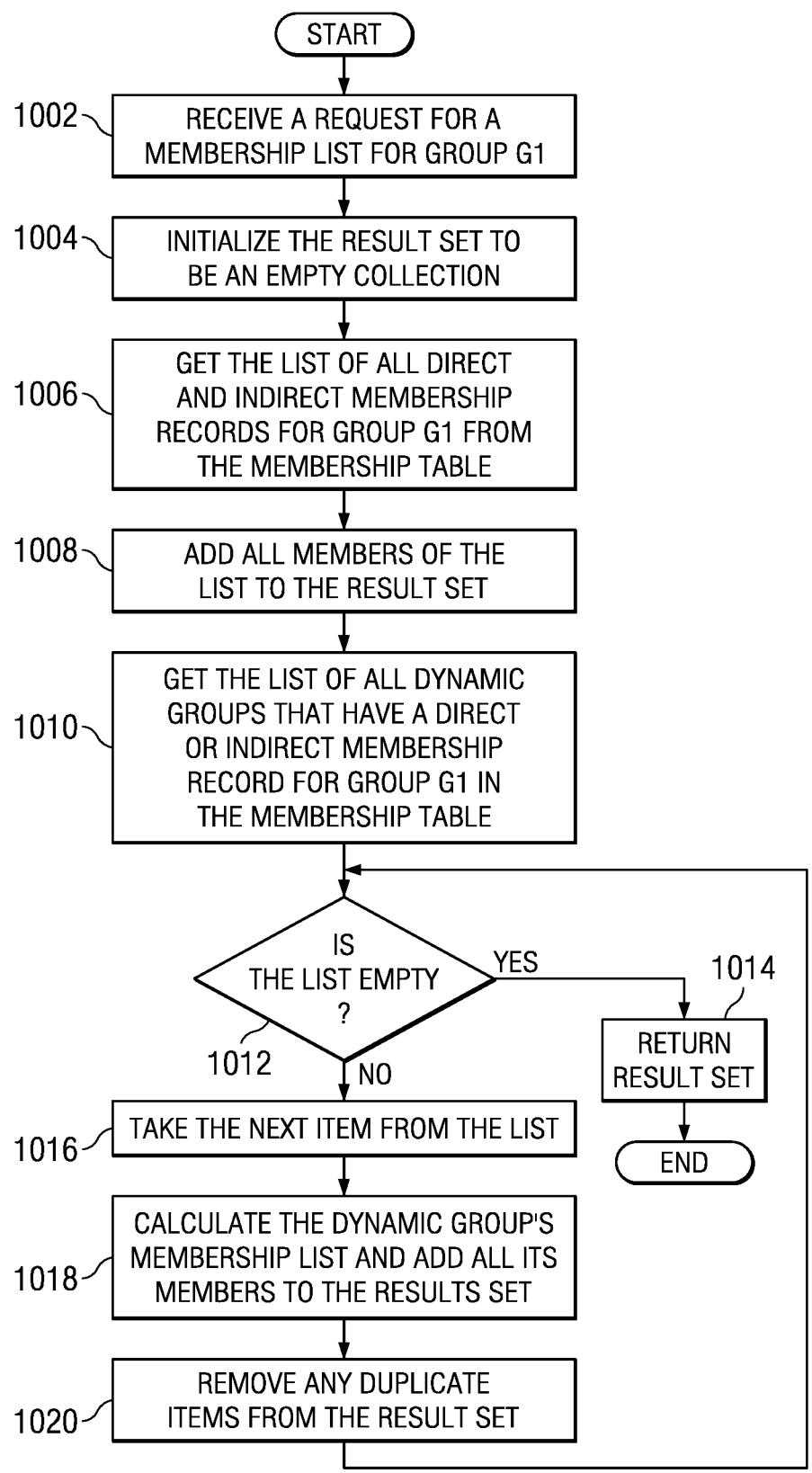
FIG. 10 is a flowchart illustrating a process for requesting a membership list for a group in accordance with an illustrative embodiment.

FIG. 10 is a flowchart illustrating a process for requesting a membership list for a group in accordance with an illustrative embodiment. In the depicted example in FIG. 10, the process is implemented in a software component, such as database manager 520 in FIG. 5.

The process begins by requesting a membership list for a group of members "G1" (step 1002). "G1" is a group name for the group of members. "G1" is any arbitrary identifier for identifying a given group. "G1" is a group that could include any number of direct and indirect members, as well as any number of static and dynamic nested groups.

The process initializes the result set to be an empty collection (step 1004). In other words, the process creates a result set or placeholder for the members of the group "G1" that have yet to be determined. The process obtains a list of all direct and indirect membership records for group "G1" from the membership table (step 1006). The process adds all members in the list of direct and indirect members to the result set (step 1008).

The process obtains a list of all dynamic groups that have a direct or indirect membership record for group "G1" in the membership table (step 1010). Although the membership table does not have records for the members of a dynamic group due to the changing nature of a dynamic group membership, the membership table does include records for members that are dynamic group members of "G1." The process makes a determination as to whether the list of dynamic groups is empty (step 1012). If the list is empty, the process returns the result set of members for the group of members "G1" (step 1014) with the process terminating thereafter. A list of dynamic groups is empty if none of the direct or indirect members of "G1" are dynamic groups. A determination can be made as to whether a direct or indirect member of "G1" that is a nested group is also a dynamic nested group by checking the nullable foreign key reference field for the given nested group in the group table, such as nullable foreign key reference 734 in FIG. 7. If the nullable foreign key reference for a nested group is null or empty, then the nested group is not a dynamic group.

Returning now to step 1012, if the process makes a determination that the list of dynamic groups is not empty, the process takes the next item from the list of dynamic members (step 1016). An item in the list of dynamic members is a group name, primary key, or other group identifier for the dynamic member.

The process calculates the dynamic group's membership list based on the attributes indicated by the query object for the dynamic group and adds all the members having the desired attributes to the result set (step 1018). The query object for the dynamic group is pointed to by the nullable foreign key reference field of the group table. The query object is executed to determine the list of members of the dynamic group.

The process removes any duplicate items from the result set (step 1020). A duplicate item could occur in the result set where a member is a member of more than one dynamic group. A duplicate item could also occur where a member is a member of both a static group and one or more dynamic groups.

The process then returns to step 1012 to determine if the list of dynamic groups contains any additional dynamic groups for which the process has not yet calculated a membership list for that dynamic group. When the process makes a determination that the list of dynamic groups is empty or that a membership for all the dynamic groups in the list have been calculated and added to the result set (step 1012) the process returns the result set (step 1014) with the process terminating thereafter.

After a membership of a given group of members has been determined, a user may desire to add a member to the group or remove a member from the group of members.

Figure 11:
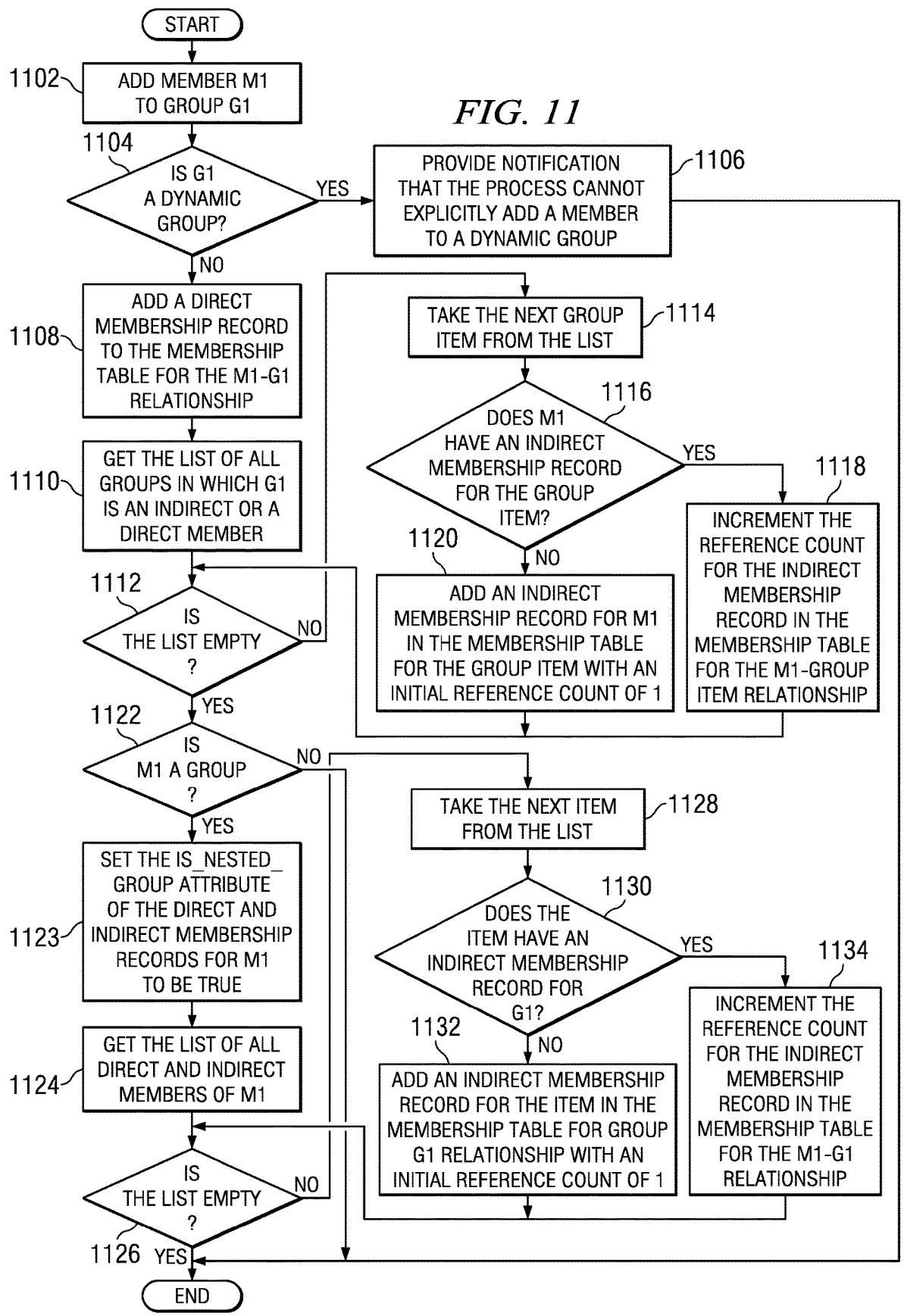
FIG. 11 is a flowchart illustrating a process for adding a member to a group in accordance with an illustrative embodiment.

Turning now to FIG. 11, a flowchart illustrating a process for adding a member to a group is shown in accordance with an illustrative embodiment. In this example in FIG. 11, the process is implemented in a software component, such as database manager 520 in FIG. 5.

The process begins by adding a member "M1" to group "G1" (step 1102). "M1" is an arbitrary member name, such as is found in member name field 742 in FIG. 7. The member name is any name or identifier for identifying a unique member in a given group of objects.

The process makes a determination as to whether group "G1" is a dynamic group (step 1104). The process determines if "G1" is a dynamic group by referring to the nullable foreign key reference for "G1" in the group table, such as nullable foreign key reference field 734 in FIG. 7. If the process determines that group "G1" is a dynamic group, the process provides notification that the process cannot explicitly add a member to dynamic group "G1" (step 1106) with the process terminating thereafter.

Returning now to step 1104, if the process determines that group "G1" is not a dynamic group, the process adds a direct membership record to the membership table for the "M1-G1" relationship (step 1108). In other words, a membership record is added to the membership table for the added member of the given group.

The process gets a list of all groups in which "G1" is an indirect or a direct member (step 1110). The process can obtain a list of all direct and indirect members by making a query to the membership table. The membership table identifies all direct and indirect members of a given group, such as group "G1."

The process makes a determination as to whether the list of all groups in which "G1" is a direct or indirect member is empty (step 1112). If the process determines that the list is not empty, the process takes the next group item from the list (step 1114). The process makes a determination as to whether "M1" has an indirect membership record for the group item (step 1116). In other words, the process wants to know if a record for "M1" already exists in the membership group. In such a case, there would be no need to create an additional duplicate copy of the record for "M1."

If the process makes a determination that a record for "M1" does exist as an indirect member for the group, the process increments a reference count for the indirect membership record in the membership table for the "M1" group item relationship (step 1118) with the process returning to step 1112 to determine if any additional items remain in the list of groups in which "G1" is a member.

If the process determines that "M1" does not have an indirect membership record for the group item, the process adds an indirect membership record for "M1" in the membership table for the group item with an initial count of "1" on the reference count for "M1" (step 1120). The process then returns to step 1112 to determine if any additional groups in which "G1" is an indirect or direct member are found in the list.

If the process determines that the list of groups in which "G1" is a direct or indirect member contains no additional entries, the process makes a determination as to whether "M1" is a group (step 1122). In other words, the process determines if "M1" is itself a nested group having members. If the process determines that "M1" is not a nested group, the process terminates thereafter.

Returning to step 1122, if the process determines that "M1" is a nested group having members, the process sets the "IS_NESTED_GROUP" attribute variable of all the direct and indirect membership records in the membership table for "M1" to "true" (step 1123). In other words, a nested field in the membership table is updated to indicate the added member is a nested group.

Next, the process gets a list of all direct and indirect members of the nested group "M1" (step 1124). The process makes a determination as to whether the list of direct and indirect members of the nested group "M1" is empty (step 1126). If the process determines that the list of members is empty, the process terminates thereafter. In other words, if the nested group of "M1" contains no members, no further processing is required.

Returning to step 1126, if the process determines that the list of members of "M1" is not empty, the process takes the next item identifying a member of "M1" from the list (step 1128). The process makes a determination if the item has an indirect membership record already in existence for "G1" (step 1130). If the process determines that an indirect membership record is not present, the process adds an indirect membership record for the item to the membership table for group "G1" and sets an initial reference count for "M1" to "1" (step 1132). In this manner, any future occurrences of an indirect membership of "M1" to group "G1" will result in incrementing the counter to "2" rather than creating another duplicate membership record for "M1."

The process then returns to step 1126 to determine if any additional members are listed in the list of direct and indirect members of "M1." The process continues to process each item in the list iteratively until a membership record for all direct and indirect members are present in the membership table for "M1."

Returning to step 1130, if the process determines that an indirect membership record for "M1" is already present in the membership table, the process will increment the reference count for the indirect membership record in the membership table for the "M1-G1" relationship by one (step 1134) rather than creating a duplicate membership record for "M1." In other words, in response to determining that a record for a given member of the nested group member is present in the membership table for the group "G1", the process will increment a reference count of the given member of the nested group member. The process returns to step 1126 and continues processing items in the list of members of "M1" until the list is empty, with the process terminating thereafter.

Figure 12:
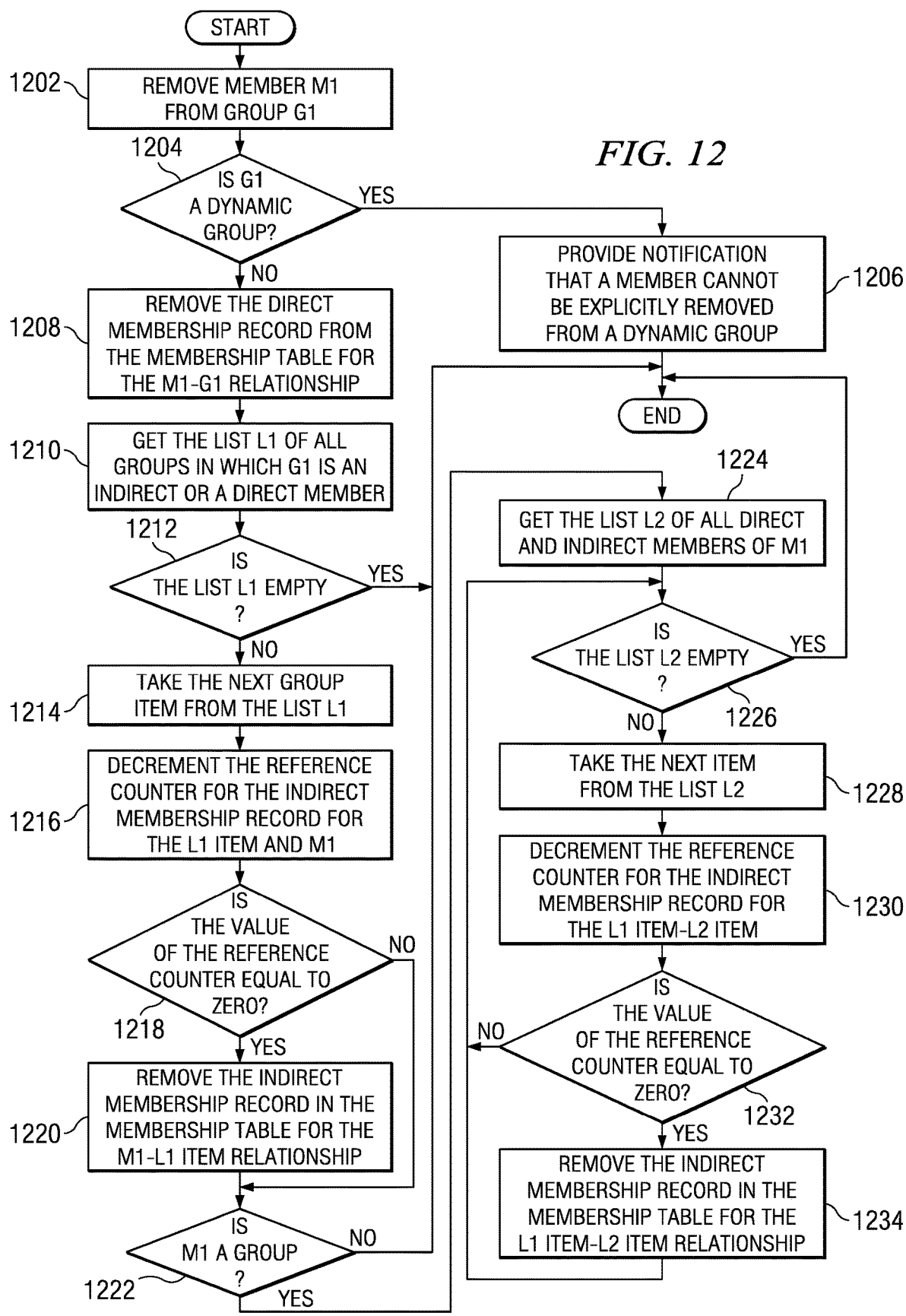
FIG. 12 is a flowchart illustrating a process for removing a member from a group in accordance with an illustrative embodiment.

FIG. 12 is a flowchart illustrating a process for removing a member from a group in accordance with an illustrative embodiment. In this example, in FIG. 12, the process is implemented in a software component, such as database manager 520 in FIG. 5.

The process begins by removing member "M1" from group "G1" (step 1202). The process makes a determination as to whether "G1" is a dynamic group (step 1204) by referring to the nullable foreign reference key corresponding to group "G1" in the group table. If the process determines that "G1" is a dynamic group, the process provides a notification to a user that a member cannot be explicitly removed from the dynamic group (step 1206).

Returning to step 1204, if the process determines that "G1" is not a dynamic group, the process removes the direct membership record from the membership table from the "M1-G1" relationship (step 1208). The process gets a list "L1" of all groups in which "G1" is an indirect or direct member (step 1210).

Next, the process makes a determination as to whether the list "L1" is empty (step 1212). If the process determines the list "L1" is empty, the process terminates thereafter. In other words, if "G1" has no direct or indirect memberships, no further processing is required. However, if the process determines that "L1" is not empty, the process takes the next group item from the list "L1" (step 1214) for processing.

The process decrements a reference counter for the indirect membership record for the "L1" item and "M1" (step 1216) to reflect the fact that "M1" has been removed from one instance of a nested group associated with "G1." The process then makes a determination as to whether the value of the reference counter is equal to zero (step 1218). If the reference counter is equal to zero, there are no further instances of "M1" in another nested group. Therefore, the process removes the indirect membership record in the membership table for the "M1-L1 item" relationship (step 1220).

Next, the process makes a determination as to whether "M1" is itself a nested group having members (step 1222). The process determines if "M1" is a nested group by checking the nested field in the membership table for the "G1-M1" relationship, such as nested field 746 in FIG. 7. If "M1" is not a group, the process terminates thereafter. However, if "M1" is a nested group, the process gets a list "L2" of all direct and indirect members of "M1" (step 1224).

The process then makes a determination as to whether the list "L2" is empty (step 1226). If the list "L2" is empty, the process terminates thereafter.

If the process determines that the list "L2" is not empty, the process takes the next item from the list "L2" (step 1228). The process decrements the reference counter for the indirect membership record for the "L1 item-L2" item (step 1230) to reflect removal of the instance of the indirect membership of the L2 item. In other words, in response to determining that the removed member is a nested group, a reference count in the indirect membership records is decremented for all groups in which the removed member was a direct member or an indirect member.

As discussed above, when a given member that is a nested group of the container group is removed, all the members of that nested group is also removed from the indirect membership of the container group. Therefore, the reference count is decremented to reflect removal of the indirect membership of the "L2 item" from the container group membership.

The process makes a determination as to whether the value of the reference count is equal to zero (step 1232). If the reference count is equal to zero, the process removes the indirect membership record from the membership table for the "L1-L2" item relationship (step 1234). The indirect membership record is removed because no instance of the given "L2 item" is an indirect member through any other nested group. Therefore, the indirect membership record for given "L2 item" is no longer required. The process returns to step 1226 where the process will continue to iteratively process each item in the list "L2" until the list is empty, with the process terminating thereafter.

FIG. 13 is a flowchart illustrating a process for creating a group of objects in accordance with an illustrative embodiment. In this example in FIG. 13, the process is implemented in a software component, such as database manager 520 in FIG. 5.

The process begins by receiving a user request to create a new group "G1" (step 1302). The process creates an entry named "G1" in the group table (step 1304). The process makes a determination as to whether "G1" is a dynamic group (step 1306). If the process determines that "G1" is not a dynamic group, the process makes a determination as to whether the user provided an initial member list for the new group "G1" (step 1308). If the user did not provide a list of members for "G1" the process terminates thereafter.

If the process determines that the user did provide a list of initial members for "G1," the process loops iteratively adding each item to the group "G1" (step 1310) with the process terminating thereafter. The process adds each member to the group "G1" in accordance with the process shown in FIG. 11 for adding a member to a group.

Returning to step 1312, if the process determines that "G1" is a dynamic group, the process gets group attribute table information from the user (step 1312). The process adds a reference to the group attribute information in the variable "QUERY_OBJECT_ID" column of the group table for "G1" (step 1314) indicating the query object for determining the dynamic group membership, with the process terminating thereafter.

Thus, the illustrative embodiments permit a relational database to utilize both static and dynamic group memberships in a group hierarchy structure while minimizing the number of queries required to obtain a group membership result set.

The illustrative embodiments provide a group table that provides a nullable key reference variable indicating if a group referenced in the table is a dynamic group. If the nullable key reference variable is null or empty, the group is not a dynamic group. However, if the nullable key reference contains a value or pointer pointing to an object defining attributes of the group membership, then the group is a dynamic group. The illustrative embodiments execute the object defining the group attributes to determine the membership of the dynamic group.

The illustrative embodiments provide an improved membership table that provides information regarding both indirect members of a group, as well as direct members of a group. Thus, a database manager can generate a list of all direct and indirect members of a group based on a single query to the membership table. In addition, the illustrative embodiments provide a nested variable in the membership table that indicates if a member of a group is a nested group. If a member is a nested group, the database manager will check the group membership table to determine if the group member is a dynamic group based on the nullable key reference.

Thus, in accordance with an illustrative embodiment, when the process receives a request for a list of members for a given group of objects associated with the database, the process identifies a set of static members for the given group of objects based on a set of records in a membership table in the database. The set of static members for the given group of objects includes all direct static members of the given group and all indirect static members of the given group.

The process identifies a set of dynamic members for the given group of objects based on a reference in a group table in the database. The reference in the group table is a reference to a query object. The set of dynamic members includes all direct dynamic members of the given group and all indirect static members of the given group. The process generates the list of members, wherein the list of members includes the set of static members and the set of dynamic members. Thus, the database manager can obtain a list of all direct and indirect static members of a group based on a single query to the membership table of a database. In addition, the database manager can obtain the members of a dynamic group based on a single query to a group table.

The list of members is used by a database manager and/or a user to manage the database. Managing a database includes, but is not limited to, creating new groups of object, adding an initial set of members to a new group of objects, adding one or more new member to a pre-existing group of objects, deleting one or more members from a pre-existing group of objects in the relational database system, updating database tables, and/or generating results in response to user queries to the relational database system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a database, the computer implemented method comprising:
   receiving a request for a list of members for a given group of objects associated with the database;
   identifying a set of static members for the given group of objects, wherein the set of static members for the given group of objects includes all direct static members of the given group and all indirect static members of the given group;
   identifying a set of dynamic members for the given group of objects defined by a set of common attributes, wherein the set of dynamic members includes all direct dynamic members of the given group and all indirect static members of the given group; and
   generating the list of members using a single query to the database, wherein the list of members includes the set of static members and the set of dynamic members and wherein the list of members is used to manage the database.

2. The computer implemented method of claim 1 wherein the database comprises a membership table that includes a nested field that indicates whether a member of the given group of objects is a nested group, wherein the nested group is a group member that is itself a group having members.

3. The computer implemented method of claim 2 further comprising:
   responsive to a determination that a member of the given group of objects is a nested member, checking a reference in a group table to determine whether the nested member of the given group of objects is a dynamic group to form a dynamic nested group.

4. The computer implemented method of claim 3 further comprising:
  executing a query object for the dynamic nested group to identify a set of members of the dynamic nested group to form indirect dynamic members of the given group of objects.

5. The computer implemented method of claim 2 further comprising:
  checking a field in the membership table to determine whether a member of the given group is one of a direct static member of the group and an indirect static member of the group.

6. The computer implemented method of claim 3 wherein the reference in the group table is a reference to a query object that defines attributes of the dynamic members of the given group.

7. The computer implemented method of claim 6 further comprising:
  executing the query object against the database to identify a set of dynamic members of the given group to form the set of dynamic members.

8. The computer implemented method of claim 2 further comprising:
  responsive to receiving a request to add a member to the given group to form an added member, adding a direct membership record to the membership table for the added member of the given group to form an added member.

9. The computer implemented method of claim 8 further comprising:
  responsive to determining the added member is a nested group, setting a field in the membership table to indicate the added member is a nested group to form a nested group member.

10. The computer implemented method of claim 9 further comprising:
  responsive to determining a record for a given member of the nested group member is present in the membership table for the given group, incrementing a reference count for the given member of the nested group member.

11. The computer implemented method of claim 9 further comprising:
  responsive to determining a record for a given member of the nested group member is not present in the membership table for the given group, adding an indirect membership record for the given member of the nested group member in the membership table for the given group.

12. The computer implemented method of claim 2 further comprising:
  responsive to receiving a request to remove a member from the given group, removing direct membership records from the membership table for the removed member to form a removed member.

13. The computer implemented method of claim 12 further comprising:
  responsive to a determination that the removed member is a nested group, decrementing a reference count in the indirect membership records for all groups in which the removed member was a direct member or indirect member.

14. The computer implemented method of claim 1 wherein receiving a request for a list of members, identifying a set of static members, identifying a set of dynamic members, and generating the list of members in claim 1 are performed by a database manager.

15. A database system for managing groups of objects, the database system comprising:
  a set of databases, wherein the set of databases further comprises:
    a membership table, wherein the membership table further comprises:
      a direct field, wherein the direct field indicates whether a given member of a group is a direct member of the group or an indirect member of the group;
      a nested field, wherein the nested field indicates whether the given member of the group is a nested group; and
      a reference count field, wherein the reference count field indicates a number of indirect memberships of the given member for the group; and
    a group table, wherein the group table includes a foreign key reference that indicates whether the group is a dynamic group.

16. The database system of claim 15 further comprising:
  a database manager, wherein the database manager uses the nested field of the membership table to determine whether a given member of the group is the nested group, wherein the nested group is a group member that is itself a group having members.

17. The database system of claim 16 wherein the database manager checks the foreign key reference of the group table to determine whether the given member of the group is a dynamic group to form a dynamic nested group member in response to a determination that the given member of the group is the nested group.

18. The database system of claim 15 further comprising:
  a database manager, wherein the database manager obtains a list of all direct and indirect static members of the group based on a single query to the membership table.

19. A computer program product comprising:
  a non-transitory computer usable storage medium having computer usable program code stored thereon for managing a database comprising a membership table, the computer program product comprising:
  computer usable program code for receiving a request for a list of members for a given group of objects associated with the database;
  computer usable program code for identifying a set of static members for the given group of objects, wherein the set of static members for the given group of objects includes all direct static members of the given group and all indirect static members of the given group;
  computer usable program code for identifying a set of dynamic members for the given group of objects defined by a set of common attributes and wherein the set of dynamic members includes all direct dynamic members of the given group and all indirect dynamic members of the given group; and
  computer usable program code for generating the list of members using a single query to the database, wherein the list of members includes the set of static members and the set of dynamic members.

20. The computer program product of claim 19 wherein the database comprises a membership table that includes a nested field that indicates whether a member of the given group of objects is a nested group, wherein the nested group is a group member that is itself a group having members.

21. The computer program product of claim 20 further comprising:
computer usable program code for checking a reference in a group table to determine whether the nested member of the given group of objects is a dynamic group to form a dynamic nested group in response to a determination that a member of the given group of objects is a nested member.

22. The computer program product of claim 21 further comprising:
computer usable program code for executing a query object for the dynamic nested group to identify a set of members of the dynamic nested group to form indirect dynamic members of the given group of objects.

23. An apparatus for managing a database, the apparatus comprising:
a computer comprising:
a database;
a bus;
a storage device connected to the bus, wherein the storage device contains a computer usable program product;
a processor unit, wherein the processor unit executes the computer usable program product to receive a request for a list of members for a given group of objects associated with the database; identify a set of static members for the given group of objects, wherein the set of static members for the given group of objects includes all direct static members of the given group and all indirect static members of the given group; identify a set of dynamic members for the given group of objects defined by a set of common attributes, wherein the set of dynamic members includes all direct dynamic members of the given group and all indirect statie dynamic members of the given group; and generate the list of members using a single query to the database, wherein the list of members includes the set of static members and the set of dynamic members.

24. An apparatus for managing a database, the apparatus comprising:
receipt means for receiving a request for a list of members for a given group of objects associated with the database;
first identification means for identifying a set of static members for the given group of objects, wherein the set of static members for the given group of objects includes all direct static members of the given group and all indirect static members of the given group;
second identification means for identifying a set of dynamic members for the given group of objects defined by a set of common attributes, wherein the set of dynamic members includes all direct dynamic members of the given group and all indirect dynamic members of the given group; and
generating means for generating the list of members using a single query to the database, wherein the list of members includes the set of static members and the set of dynamic members and wherein the list of members is used to manage the database.

* * * * *